United States Patent [19]

Petit et al.

[11] Patent Number: 4,639,668
[45] Date of Patent: Jan. 27, 1987

[54] ANALOG MANIPULATOR WITH PROXIMITY DETECTION OF A MOVEABLE MAGNETIZABLE MASS

[75] Inventors: Pierre Petit, Champniers; Jean-Marie Periot, La Couronne, both of France

[73] Assignee: La Telemecanique Electrique, France

[21] Appl. No.: 699,099

[22] Filed: Feb. 7, 1985

[30] Foreign Application Priority Data

Feb. 8, 1984 [FR] France .................................. 84 01917

[51] Int. Cl.$^4$ ........................... G01B 7/14; G05G 9/00
[52] U.S. Cl. .................................... 324/208; 200/6 A; 340/709; 74/471 XY
[58] Field of Search ............... 324/207, 208; 200/6 A, 200/52 R; 74/471 XY; 340/870.31, 870.32, 709; 361/179, 180

[56] References Cited

U.S. PATENT DOCUMENTS

| 4,352,965 | 10/1982 | Sounson | 200/6 R |
| 4,489,303 | 12/1984 | Martin | 74/471 XY X |
| 4,492,925 | 1/1985 | Kammerer et al. | 324/207 X |
| 4,550,316 | 10/1985 | Whetstone et al. | 340/709 X |

FOREIGN PATENT DOCUMENTS

| 1008385 | 5/1957 | Fed. Rep. of Germany | 200/6 A |
| 626139 | 7/1949 | United Kingdom | 200/6 A |

Primary Examiner—Gerard R. Strecker
Assistant Examiner—Robert W. Mueller
Attorney, Agent, or Firm—William A. Drucker

[57] ABSTRACT

An analog proximity detector manipulator comprising, in a case with which are associated an electronic case containing the detectors and a piece for fixing to a table, a sub assembly containing an annular elastomer part which serves for pivoting and bringing back to the neutral position the control lever and a mass whose position influences the detectors.

8 Claims, 9 Drawing Figures

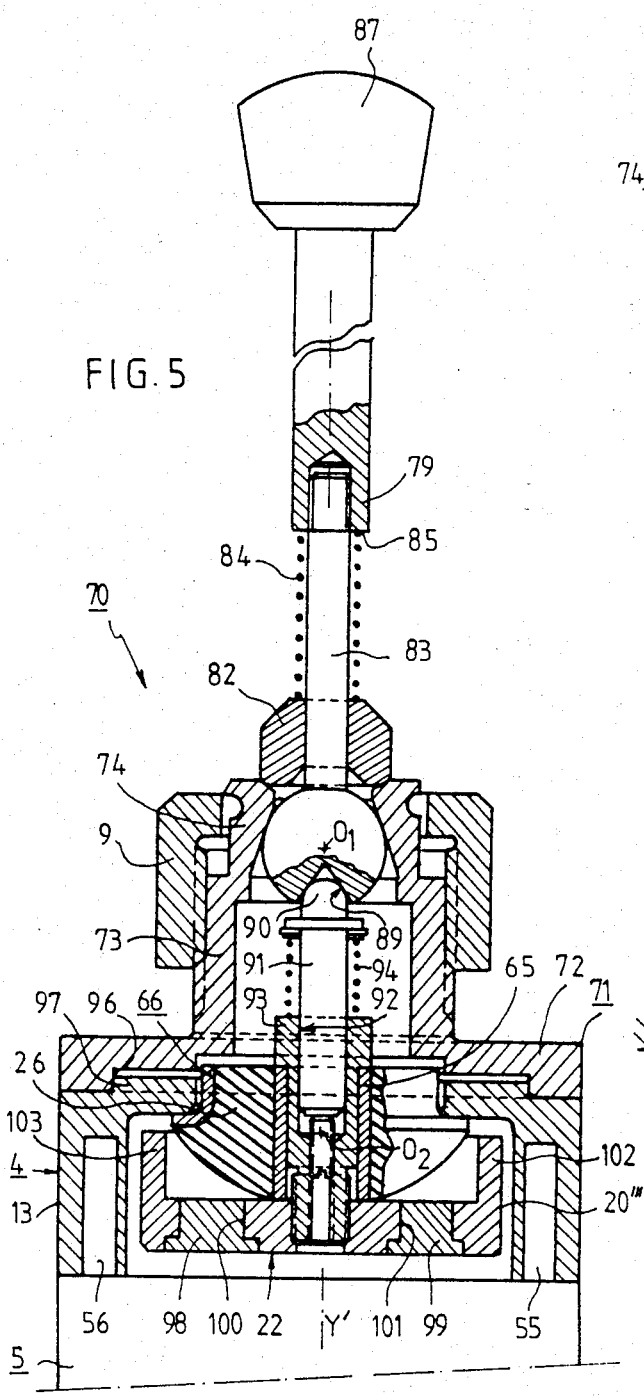
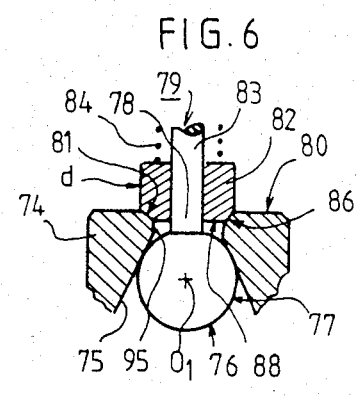
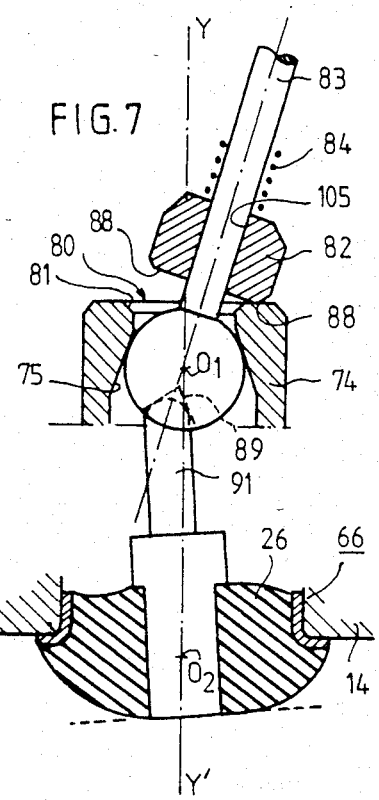

ns of the invention will be better understood from reading
ANALOG MANIPULATOR WITH PROXIMITY DETECTION OF A MOVEABLE MAGNETIZABLE MASS

BACKGROUND OF THE INVENTION

1. Field of the Invention

The invention relates to an analog manipulator comprising in a case:

two pairs of inductive proximity detectors placed respectively on two rectangular axes and symmetrically with respect to the point of intersection thereof, a magnetizable respectively conducting metal mass, adapted either to be placed in particular spatial positions at a constant distance from a point of rotation and at variable distances from the four detectors, or, under the effect of resilient return means, to take up a rest position aligned along a longitudinal axis in which the influence of this mass is equivalent on the four detectors, means for pivoting the point of rotation of the magnetizable mass, operating means adapted for taking up in space an orientation while imparting to the metal mass to which they are connected one of the particular positions, electronic means associated with the detectors and adapted for processing their physical state changes following a movement of the metal mass so as to deliver electric signals corresponding to the orientation of the operating means.

2. Description of the Prior Art

Such manipulators find numerous applications not only in the intuitive electric control of moving bodies (cranes, small vehicles, remote handling apparatus) but also in the control of the movements of particular dots or images appearing for example on the screen of a cathode ray tube; they may naturally be used as apparatus for detecting the position or the orientation of any object.

A manipulator is already known for example from French patent No. 2 428 867 belonging to the applicant having the general construction mentioned above in which the resilient return means are formed by a spring and in which the pivoting means have the properties of a ball joint, not stated moreover.

Manipulating apparatus are known moreover for example from French Pat. Nos. 1 390 854 and 1 225 469 in which a central mass, movable between four detector devices, is mounted on a resiliently deformable piece which serves as a pivot and which is directly connected to operating means conferring thereon a rest position.

In all these known apparatus the pivoting means and the means providing return to the rest position are space consuming, and moreover no protective means is provided for isolating the detector devices used from the environment. These apparatus, which benefit however from being highly insensitive to movements which might result from the application of a parasite force exerted along the longitudinal axis of the operating member, have no property for damping the oscillating movements which may occur in the vicinity of their neutral position, which may form a serious drawback, in particular when the manipulators are used for controlling motors.

The invention proposes consequently providing a manipulator conforming to the general construction mentioned above and in which measures will be taken so as to substantially reduce the dimensions thereof while improving the protection of the detector devices and in preserving principally for the rest position a great insensitivity to transverse and longitudinal parasite forces exerted on the operating member.

SUMMARY OF THE INVENTION

For this, in accordance with the invention, the detectors are connected to a differential measuring circuit and the resilient return means as well as the pivoting means for the magnetizable mass are formed by an annular piece made from an elastomer material whose periphery is secured to a dividing wall of the case and whose central region has passing therethrough a rigid piece having a first end mechanically connected to the operating member and a second end firmly fixed to the metal mass, the relative position of this latter and of the detectors being chosen so that a small movement of this mass along the longitudinal axis generates as identical distance variation between the metal mass and each of the detectors, so that the signal supplied by the differential circuit is not altered by this movement, said distance variation being able to be zero.

Sealed movement transmission means are already known in which a deformable elastomer piece serves for providing the respective isolation and pivoting of a part movable with respect to a case; for these types of application in which a longitudinal movement in the neutral position has no reason to occur or to compromise correct operation, no use is however made either of the constancy of the elastic properties of the deformable pieces or of their damping properties.

BRIEF DESCRIPTION OF THE DRAWINGS

The invention will be better understood from reading the following description, with reference to the accompanying Figures in which:

FIG. 5 illustrates an elevational view in section through a plane passing through the longitudinal axis of a second embodiment of a manipulator with substantially constant actuating force, FIG. 6 shows in longitudinal section a detail of the return and pivoting means for the operating lever of the manipulator as shown in FIG. 5 and placed in the neutral position, and FIG. 7 shows a non neutral position of the return and pivoting means of the manipulator as shown in FIG. 5.

DESCRIPTION OF THE PREFERRED EMBODIMENT

Figure 1:
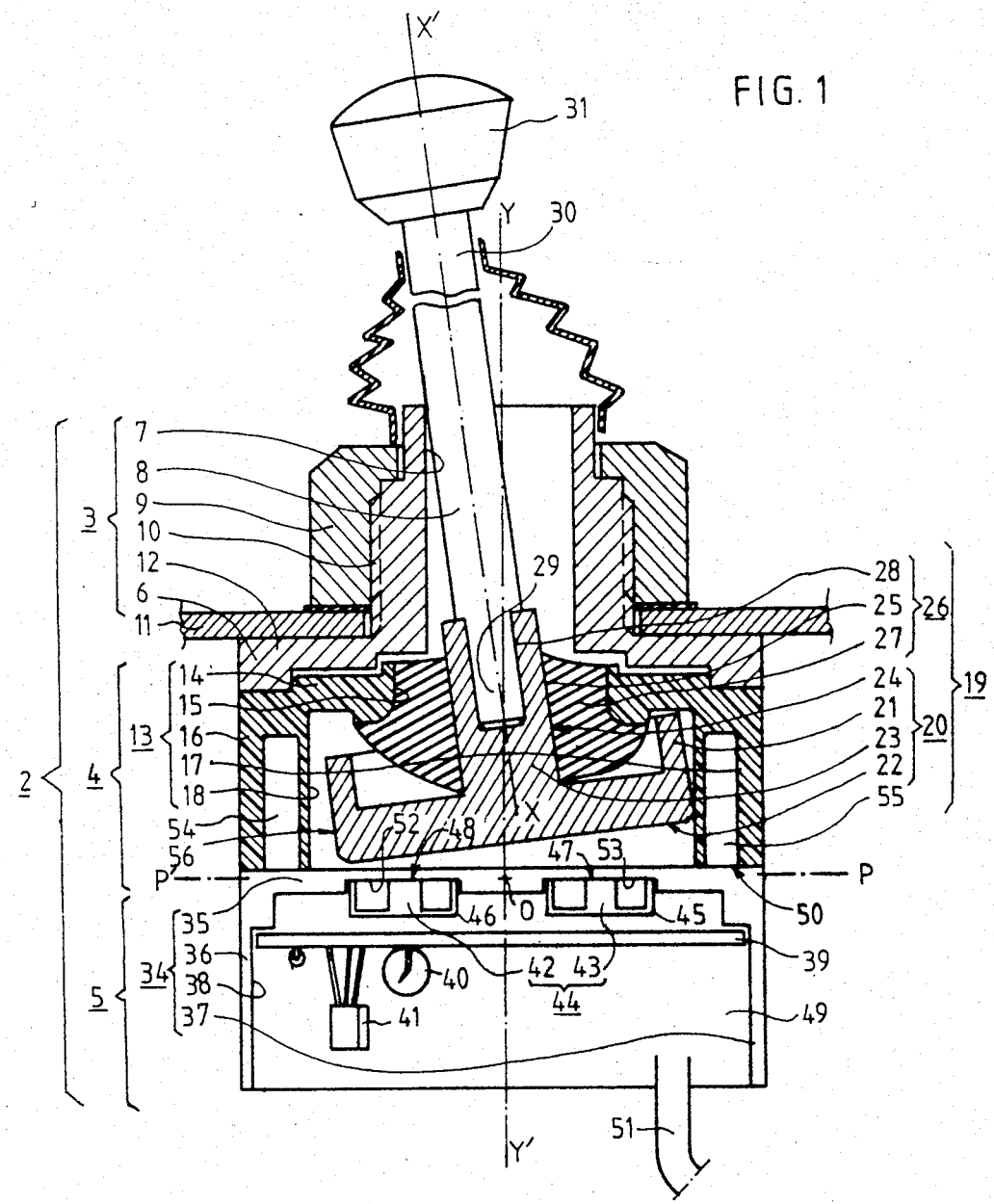
FIG. 1 is an elevational view of a progressive actuation force manipulator shown in section through a plane passing through the longitudinal axis of its case.

A manipulator 1 shown in FIG. 1, comprises a body 2 formed by the association of sub assemblies 3, 4 and 5.

Sub assembly 3 comprises a support 6 whose purpose is both to form a means 7 for limiting the angular movements of an operating lever 8 and to provide holding means 9 respectively 12 for fixing the manipulator to a table or plate 11.

The limiting means is here formed by the internal cylindrical surface 7 of a cylindrical collar 12 having a threaded portion 10 for receiving a nut 9, this collar being integral with a perpendicular flange 12.

Sub assembly 4 comprises a non magnetizable and insulating case 13 of prismatic shape which has a dividing wall 14 with a central opening 15 having axis YY' and four perpendicular side walls such as 16, 17 between which is located a cavity 18 adapted for receiving more especially an orientatable device 19.

This orientatable device 19 comprises a magnetizable and (or) current conducting mass 20 having the general form of a solid of revolution with axis XX' having raised edges or skirt 21 with a substantially flat active face 22 and a coaxial hub 23 opposite this face.

The outer surface 24 of this hub is integral with the central region 25 of an annular piece 26 made from an elastomer material and whose periphery 27 is placed opposite opening 15 so as to be secured at this level with dividing wall 14, for example by bonding.

Figure 2:
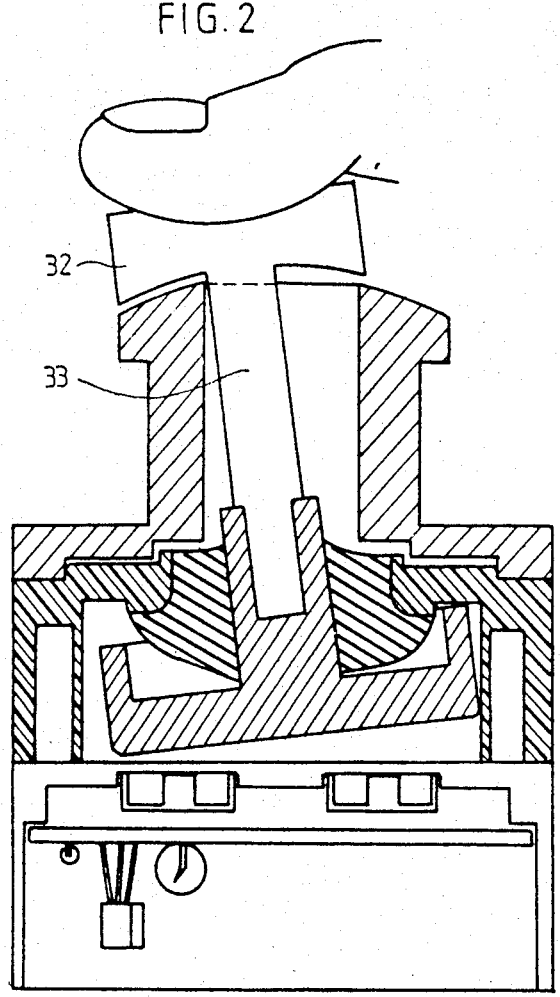
FIG. 2 illustrates a longitudinal sectional view of the manipulator in which the control lever has been transformed into a manual key.

Hub 23 has means 28 for mechanical connection with one end 29 of the lever 8 which is opposite end 30 carrying a knob 31; in a variant shown in FIG. 2, this knob could be in the form of a hollow key 32 placed at the end of the shorter lever 33 so that the apparatus may be operated by a single finger and not by several.

Sub assembly 5 comprises a receptacle 34 having a transverse dividing wall 35 applied and fixed against the open face 50 of case 13 and lateral walls such as 36, 37, a cavity 38 in which is located, parallel to dividing wall 35, a printed circuit card 39 having electric and/or electronic components such as 40, 41 and 42, 43 forming part of a detection circuit adapted so as to deliver output signals giving an image of the position of mass 20 and so that of the operating lever 8.

This circuit comprises more particularly four coils associated with four ferrite pots disposed in pairs such as 44 symmetrical with respect to a point O and along two perpendicular axes which intersect at point O in a transverse plane PP' along the longitudinal axis YY'.

The coils of one pair, whose respective sensitive faces are directed towards the active face 22 of the mass 20 form (possibly with associated ferrite pots) the inductances of two LC type oscillating circuits, whose impedances are modified by the distance existing between the active and sensitive faces. For such an impedance variation, which results more especially from the damping caused by currents induced in the mass, this latter should have not only properties of magnetic permeability but also properties of measured electric conductivity; a steel material and a small distance between the active and sensitive faces are perfectly suitable for obtaining the desired damping.

Cavity 38 is filled with a curable plastic mass 49 which provides insulation and holds the circuit in place and also provides sealing for a connecting cord 51 containing power supply conductors and conductors transporting the output signals delivered by the circuit.

When no action is exerted on lever 8 and when, consequently, axis XX' merges with axis YY', the arrangement of pots 42, 43 must be as geometrically symmetrical as possible so that, on the one hand, the impedances of the two oscillators of each pair are as closely related as possible so as to reduce accordingly the time required for the electric alignment of the adjusting components intended to transmit the zero signals for this position and so that, on the other hand, the evolution of the signals is identical for symmetrical angular movements of the mass.

Such a symmetry of mounting the pots may be obtained by disposing in the walls such as 35 four housings such as 52, 53 formed during molding of the receptacle for receiving and centering these pots.

The arrangement of the pots which has just been described and which is preferred because of the compactness of assembly which it provides and because of the insensitivity from which the neutral position benefits when mass 20 is slightly offset along axis YY', for example because of an unfavorable accumulation of manufacturing tolerances or because a parasite axial force is exerted on knob 31, may have other variants. Thus the pots could be placed in lateral pockets such as 55, 55 which are formed in dividing walls 16 and 17 and open into face 50. In this case, the external cylindrical surface 56 of mass 20 plays the role of the preceding active face 22 for each oscillator.

Figure 3A:
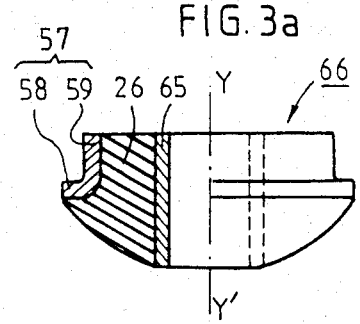
FIGS. 3a and 3b show an axial section and respectively a top view of a sub assembly comprising a flexible member for pivoting the device and returning it resiliently to the neutral position.
Figure 3B:
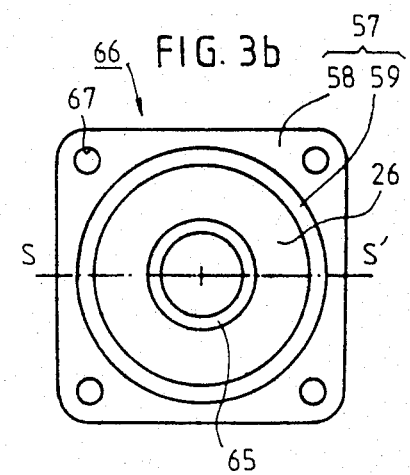

In one advantageous embodiment of the invention in which the elastomer piece forms part of a removable sub assembly 66, see FIGS. 3a, 3b, the angular deformable piece 26 is obtained by molding an appropriate elastomer material accurately over a central metal socket 65 cylindrical in shape and over a metal collar 57 having a square contour base 58 placed on wall 14 perpendicularly to axis YY' by means of fixing holes 67 and in which is stamped a tubular portion 59 of low height.

Figure 4A:
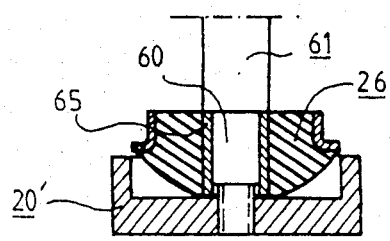
FIGS. 4a and 4b show in section two methods of fastening the operating lever and the active mass to the flexible member shown in FIGS. 3a and 3b.
Figure 4B:
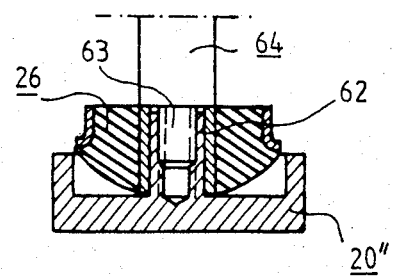

Socket 65 then receives either the end 60 of an operating lever 61 to which mass 20' is fixed, see FIG. 4a, or the hub 62 of a mass 20'' to which is fixed the end 63 of the operating lever 64, see FIG. 4b.

The use of an annular piece such as defined above has the advantages of combining in the same element: the means for returning the operating lever to the neutral position and damping its movements about this position because of the elasticity and respectively internal friction properties of the material used for this piece, the means for pivoting the lever because of the deformation properties of the material and finally the sealing means which shelter the inner region of the case from the atmosphere.

A manipulator having the construction which has just been described provides the operating lever with a relatively powerful return torque proportional to its slant, this latter being held within limits of the order of 10°. The output signals of the electronic circuit which are themselves proportional to this slant give then an image of the force supplied to the knob at the end of the operating lever and so are suitable for applications in which the operator desires to feel in his hand an image of the forces exerted by a mechanical system itself controlled by the signals.

In other applications it is on the other hand desirable for the forces to be applied to the operating lever to be as small as possible and practically constant so that the output signals give an image of larger movements which are communicated thereto.

For this type of application, it is often necessary to stabilize the operating lever in its neutral position so as to prevent the low resilient recall forces, which are communicated thereto in the neutral position, from being less than the friction forces, (which would result in the generation of a permanent low output signal even in the absence of operation) or less than the inertial forces which might be communicated thereto in an environment exposed to vibrations and which might cause the appearance of weak random signals.

A manipulator 70 capable of responding to this type of application is shown in FIG. 5 in which the parts or sub assemblies having the same functions as above bear the same references.

A part 71 for fixing the manipulator has as above a transverse dividing wall 72 which is fixed to a case 4 containing mass 20''' and receiving the electronic device 5 adapted for delivering the signals. This fixing part has a tubular collar 73 whose external end 74 comprises a conical surface 75 which converges outwardly and against which is applied the outer surface 76 of a sphere 77 integral with an end 78 of an operating lever 79, see in particular FIG. 6.

A front flat annular surface 80 placed at the end of collar 73 is connected to the tapered surface 75 by a shallow tapered chamfer 81 and receives a ring 82 which may slide along rod 83 belonging to the lever; this ring which is urged towards surface 80 by a compression spring 84 bearing on a shoulder 85 has a diameter d and comprises a conical chamfer 86 of dimensions such that this latter penetrates into the chamfer 81 under the effect of a moderate initial compression force from the spring when the lever is in a neutral position coaxial with the longitudinal axis YY' of the collar. Lever 79 is thus pivoted on collar 73 and stabilized in its neutral position which requires an initial non zero force to be exerted on knob 87 so as to move the lever away.

When this initial force is overcome and when the lever is slanted to a greater extent, an edge 88' or a surface portion 88 of ring 82 bears and slides on surface 80 at the same time as the bore 105 of the ring bears and slides on the rod 83, see FIG. 7, while causing an additional compression of the spring; this imparts to this lever an antagonistic return torque which remains moderate and increases slightly with the slant, this latter being for example limited to 30° with respect to the axis YY'.

The central region of this sphere 77 with center $O_1$ which is opposite the lever, has a housing 89 for example conical in shape which receives a rounded end 90 of a transmission rod 91 interlocked with socket 65 and mass 20'''.

This rod may possibly slide towards the sphere in a bore 92 of an intermediate piece 93 under the effect of a spring 94 so as to compensate for the free motion which appears when, through a meshing effect, the sphere pivots about its center $O_1$ driving with it the end 90 which pivots about a fictitious center $O_2$, placed substantially in the middle of socket 65.

It is also possible to make rod 91 entirely solid with socket 65 and with the mass and to give this rod a slightly greater length than that shown in FIG. 5 so that, at the time of mounting the support 71, a slight axial compression YY' is supplied to the resilient ring 26 and so that the play is taken up during manipulation of the lever. Such a longitudinal compression of ring 26 in the neutral position causes a slight movement of surface 22 nearer to mass 20 which does not cause an output signal to appear because of the differential mounting of the oscillators associated with the oppositely placed coils.

With the dimensions chosen in FIG. 5, a reduction ratio close to 5 is established between the slant of rod 91 and that of lever 79, so that the antagonistic torque exerted by the rod on the lever is thus also divided by 5; the operating lever is therefore subjected to a small additional return force which is added to the one developed by spring 84 but which remains very moderate.

The slant of the operating lever is limited by rod 83 meeting the narrowest internal region 95 of the collar, see FIG. 6.

The assembly of the elements of such a manipulator should not cause parasite angular deformations of the elastomer ring which would be likely to disturb the non existence of the output signals of the electronic sub assembly 5 set by previous calibration before assembly of part 71.

A good cooperation of sphere 77, which contributes to giving lever 79 a mechanical neutral position, with rod 91 having a mechanical position of balance corresponding to the absence of output signals, is obtained by cooperation of an internal cylindrical surface 96 of part 71 with a cylindrical boss 97 of small height belonging to case 13.

Although the use of a mass 20''' formed as a single piece has the advantage of manufacturing simplicity, it may be desirable for this mass to be in divided form for example so as to avoid parasite coupling between the pots of the sensors.

Such an embodiment is shown in FIG. 5 where two from four elementary masses 98, 99 have been shown in corresponding housings 100, 101 belonging to an orientatable plastic support 102; these elementary masses would naturally be disposed in the skirt 103 of support 102 if the pots of the proximity detectors were placed in the lateral pockets 55, 56; it is clear that, in this latter arrangement, the use of centering means such as 96, 97 is absolutely indispensable considering the contrary effects caused by lateral movement of part 102 over the lateral proximity sensors.

What is claimed is:

1. An analog manipulator comprising :
    a first case of prismatic shape which has an upper wall provided with a central opening, side walls extending perpendicularly to said upper wall, and a lower open face, said upper wall and said side walls delimiting a cavity;
    a magnetizable mass located in said cavity and having an axis XX' and an active face ;
    a lever coaxial to said mass and extending opposite said face through said central opening and having a first end secured to said mass, and a second end connected to an operating member;
    resilient pivoting and return means formed by an annular piece made from elastomer material and having a peripheral region secured to said upper wall and a central region through which passes and is secured said lever, and
    an electronic assembly fixed to said open face of the case and comprising two pairs of proximity detectors facing said active face of said mass, the relative position of said active face and of the detectors being chosen so that a small movement of said mass along said axis generates an identical distance variation between the magnetizable mass and each of said detectors.

2. An analog manipulator according to claim 1, wherein said resilient pivoting and return means comprise a collar secured to the peripheral region of said annular piece and provided with removable fixing means to said upper wall.

3. An analog manipulator according to claim 1, which further comprises a tubular collar through which passes said lever, said collar being removably fixed on said upper end so as to limit the angular movements of said lever and comprising an external threaded portion for receiving a nut.

4. An analog manipulator according to claim 1, wherein said second end of the lever has a spherical shape and said operating member comprises a second lever having a spherical end portion provided with a cavity in which is engaged said second end, said spherical end portion bearing on a conical surface of a second collar fixed on said upper wall of the case so as to form a ball and socket joint.

5. An analog manipulator according to claim 4, which comprises elastic bearing means located between said second lever and said second collar so as to resiliently apply said spherical end portion on said conical surface.

6. An analog manipulator according to claim 5, wherein said second lever comprises an operating knob and said elastic bearing means comprises a ring traversed by the second levers and which bears on said second collar and a compression spring placed between said ring and said operating knob.

7. The manipulator as claimed in claim 1, wherein a dividing wall of an electronic sub assembly has internal housings for receiving and centering, with respect to said longitudinal axis, two pairs of proximity detectors electrically connected to a printed circuit card, said dividing wall coming into the vicinity of the active parallel face of the mass when it is placed against an open face of the case which contains this mass.

8. The manipulator as claimed in claim 1, wherein said mass comprises a magnetic support in which two pairs of elementary masses are fixed, opposite the detectors.

* * * * *